Feb. 2, 1954
F. McCALL ET AL
2,667,730
SIDE DELIVERY RAKE
Filed May 22, 1950
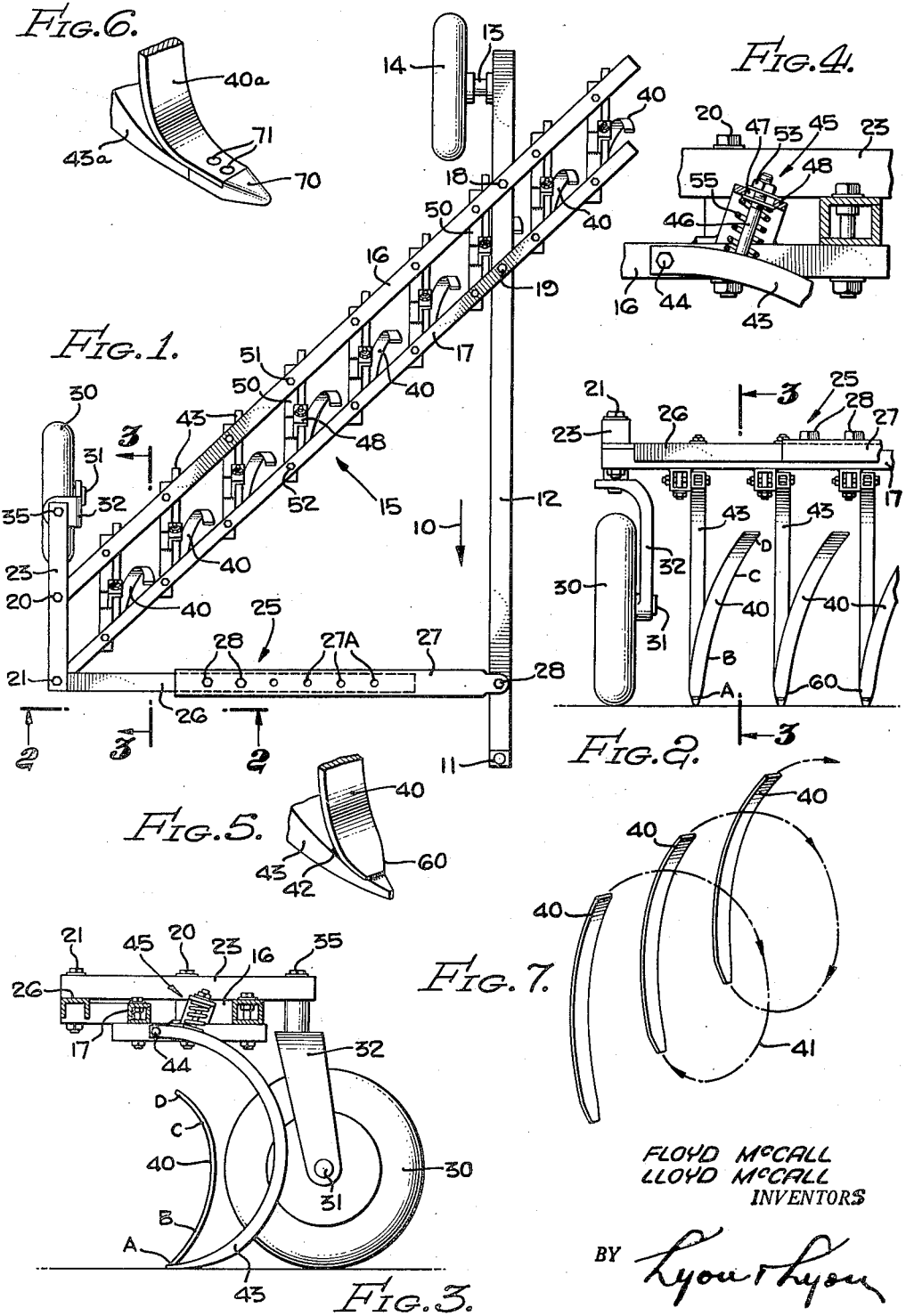
FLOYD McCALL
LLOYD McCALL
INVENTORS
BY Lyon & Lyon
ATTORNEYS Patented Feb. 2, 1954

2,667,730

UNITED STATES PATENT OFFICE 2,667,730

SIDE DELIVERY RAKE

Floyd McCall and Lloyd McCall, Romoland, Calif.

Application May 22, 1950, Serial No. 163,522

10 Claims. (Cl. 56—376)

The present invention relates to an improved raking device for gathering or collecting hay and the like.

It is desirable to provide a device or machine of this character which forms the gathered hay in loose stacks through which air is allowed to circulate during the drying period while such stacks remain on the field, to thereby obtain a better grade of hay.

The present invention contemplates production of harvested hay in the form of loose tubes or rolls, such tubes or rolls being produced by causing the hay to travel generally in a spiral when and as it is being gathered by the machine.

It is therefore an object of the present invention to provide an improved machine of this character for achieving the above mentioned desirable results.

Another object of the present invention is to provide an improved machine of this character in which the tines or rake teeth have a compound curvature each of which lie generally on a spiral extending in echelon with respect to the forward movement of the vehicle upon which such tines or rake teeth are mounted.

It is understood that the term "compound curvature," as used herein in characterizing the structural features of the rake teeth or tines, is intended to mean a tine or rake which has a curvature extending not only in the direction of movement of the vehicle upon which it is mounted, but also has curvature in a direction transverse or lateral to such direction of movement.

A further object of the present invention is to provide an improved raking device or machine of this character having a plurality of tines with compound curvature mounted thereon for the purpose of imparting a rolling movement to the hay when and as it is gathered to form the same in a loose roll or tube.

A further object of the present invention is to provide an improved rake structure of this character wherein the tines or rake teeth are mounted on an adjustable supporting beam which extends in echelon with respect to the direction of vehicle movement, the machine being characterized by the fact that the echelon angle may be adjusted with such adjustment serving simultaneously to adjust the lateral spacing between the tines or rake teeth.

A further object of the present invention is to provide an improved machine of this character having a plurality of tines with compound curvature, each tine lying generally on a spiral extending in echelon with respect to the direction of movement, with adjustment means whereby the lateral spacing between the tines may be adjusted to thereby produce a corresponding "loose" or "tight" spiral.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 is a plan view of a device intended to be pulled by a tractor or the like and embodies features of the present invention.

Figure 2 is an enlarged view taken generally in the direction indicated by the arrows 2—2 in Figure 1, Figure 3 is an enlarged sectional view taken in the general direction indicated by the lines 3—3 in both Figures 1 and 2, Figure 4 shows in enlarged form some of the mechanism shown in Figure 3, Figure 5 shows, on an enlarged scale, a portion of the rake tine closest to the ground, Figure 6 is a view, on an enlarged scale, similar to Figure 5 and shows a modified structure incorporating a replaceable tine tip, Figure 7 serves to illustrate the compound curvature of the tines which lie generally on a spiral extending in echelon to the direction of movement of the vehicle.

The device or machine shown in Figure 1 is intended to be drawn in the direction indicated by the arrow 10 by a powered vehicle such as a tractor attached to the trailer hitch 11 on the forward end of the longitudinally extending central frame member 12. The aft end of the frame member 12 has mounted thereon the wheel axle 13 upon which is mounted the ground engaging wheel 14. The rake assembly, having the general reference character 15, extends in echelon with respect to the direction 10, and includes a support beam 16 which extends parallel with a second supporting member or strap 17. The members 16, 17 are time supporting members and are each pivotally mounted respectively at 18 and 19 on the frame member 12, and are also pivotally mounted respectively at 20, 21 on the outboard frame member 23. This frame member 23, as seen in Figure 1, extends parallel with the frame member 12 and is connected thereto by an adjustable extensible connection 25. This adjustable connection 25 is effected by the laterally extending members 26, 27 which may either telescope one within the other or overlap, in either case there being provided in the outer member 27 a plurality of apertured portions 27A cooperating with apertured portions in the other member 26, through which bolts 28 may pass to firmly hold the members 26, 27 in adjusted position with respect to each other. The outside end of the member 26 is fixed to the frame member 23 as, for example, by welding, bolting or the like, while the inner end of member 27 adjacent the frame member 12 is pivotally attached to such frame 12 at 29.

The frame member 23 is supported above the ground by the ground engaging wheel 30 rotatably mounted on the axle 31, the axle 31 in turn being mounted on the frame 32 which is swiveled on the frame 23 about the axis of the pivot pin 35 which serves to secure the frame members 23 and 32 together. Thus, whereas the rotational axis of the ground engaging wheel 14 is fixed with respect to the frame member 12, the rotational axis of the other ground engaging wheel 30 may be oriented in various positions with respect to the frame member 12 to facilitate turning of the device. It is thus observed that the frame members 12, 23, extensible connection 25 including members 26, 27 and members 16, 17 provide a supporting frame or chassis for the rake assembly 15.

The rack assembly 15 includes, in accordance with important features of the present invention, a plurality of tines or rake teeth 40, each having a compound curvature as defined above, such tines 40 being formed of flat metal strips curved both in the direction of movement and in a direction lateral or transverse to such direction of movement, and such that each of such tines lie on a spiral of uniform pitch as illustrated by the spiral 41 shown in diagrammatic form in Figure 7. Each of these tines 40 are affixed, as for example, by weld material 42 (Figure 5) at their lower ends to a pivotally mounted supporting bar 43. The upper end of such bar 43 is pivoted about the axis of the pivot pin 44 on the support beam 16. It is thus observed that the tines 40 are supported at their lower ends as a cantilever on the lower ends of the bars 43; and, in turn, the bars 43 are supported as a cantilever or arm on the pivot pin 44. The lower ends of the tines 40 and bars 43 are maintained an adjusted predetermined distance above the ground by the adjustment mechanism 45, shown in both Figures 3 and 4.

This mechanism 45 comprises a stud bolt 46 having its lower end in Figure 4 affixed to the bar 43 and its upper end passing through an enlarged opening 47 in the bracket plate 48. This bracket plate 48 is affixed, as for example, by welding to a corresponding cross support member 50 (Figure 1) having its opposite ends pivotally mounted about the axes of pivot pins 51, 52 extending respectively through the echelon extending supporting members 16, 17. It is thus apparent that the position of the adjustable nut 53 threaded on the upper end of the stud bolt 46 determines the distance between the tines and the ground. It is observed further that a prestressed coil compression spring 55, having one of its ends bearing against the bar 43 and the other one of its ends pressing against the bracket member 48, biases the tines downwardly to such adjusted position. The provision of this resilient connection provided by the spring 55 allows some upward movement of the tines when, for example, the tines engage a rock or boulder in the field, so that such tines may clear the same. In this respect it is noted that each one of the tines is mounted for independent upward movement.

Focusing attention to the specific construction of the tines 40, in relationship to Figures 2, 3 and 5, it is observed that the lower ends of the tines are tapered at 60 and are contiguous with the tapered ends of the bars 43, so that a pointed structure initially engages the hay lying on the ground. As seen in Figure 3, the amount of curvature in the range A—B is relatively small, such curvature increasing slightly in the range B—C, and then such curvature decreases in the range C—D, such curvature being in the direction of movement of the vehicle. It is observed further that the tines 40 are each curved in a direction transverse or lateral to such direction of movement, as shown in the front elevational view in Figure 2. Such curvature along two mutually perpendicular axes is referred to herein as a compound curvature, as defined hereinabove. It may be desirable to provide the tines with a replaceable tip, and in such case the structure shown in Figure 6 is preferred. In Figure 6, the modified tine 40A and bar 43A may be fastened together and to an expendable pointed tip 70 by releasable bolts 71, it being observed that in such case the end of the replaceable tip 70 is a pointed structure similar in major respects to the pointed structure shown in Figure 5.

While Figure 1 shows an equal spacing between adjacent tines 40, it is understood that it is within the province of the present invention to make such spacing nonuniform, while yet maintaining compound curvature in each one of the tines. In this respect, for example, the tines closest to the frame member 23 may be spaced closer together than the tines nearest the frame member 12; and such spacing may be nonuniform along the supporting members 16, 17. In such case, it may be desirable to provide each one of such tines 40 with a different degree of compound curvature such that all of the tines lie generally on a continuous spiral (such as the spiral 41), but with the convolutions of such spiral of increasing pitch in the direction extending from the frame member 23 to the frame member 12.

By providing the various pivoted connections described hereinabove, it is observed that the frame member 23 may be adjusted to lie closer or further away from the other parallel extending frame member 12. Such adjustment may be effected by removing and inserting the bolts 28 through different cooperating apertured portions of the telescoping or overlying frame members 26, 27. In this respect it is noted that the frame members 23, 12 and supporting members 16 and 17 form a pivoted parallelogram structure which is maintained in an adjusted position by the aforementioned bolts 28. It is observed further that the cross members 50, being pivotally mounted at opposite ends to the supporting members 16, 17, always extend generally parallel to the direction of movement as represented by the arrow 10, regardless of the adjusted position of the members 26, 27, so that in all adjusted positions each individual tine, considered separately, presents itself in the same manner to the hay being gathered, although by such adjustment the lateral spacing between the tines is altered.

By providing the tines with compound curvature and disposing them in echelon as shown in Figure 1, a lowering movement is imparted to the gathered hay, so that the hay in its echelon movement, while thus lowering, forms itself into a roll or hollow tube. The production of such roll or tube is desirable since it allows good circulation of the air through the hay while it is lying on the field, to thereby effect quick and uniform drying of the hay mass.

In general, the "tightness" or diameter of the roll may be controlled by imparting different degrees of compound curvature to the individual tines. Such "tightness" is also effected to a certain extent by the distance of lateral separation between the adjacent tines 40 and in general, the closer the spacing, the smaller the amount of curvature required in each tine. Also, assuming fixed spacing, the greater the compound curvature of the tines, the looser the resulting hay roll. The above generalities are true and independent of the speed of the vehicle within, of course, the normal speed range of the vehicle.

Further, the optimum amount of compound curvature is related to the echelon angle at which the supporting members 16, 17 extend; and since this is true, an optimum condition may be reached for producing the best type of hay roll upon adjusting the members 26, 27 with respect to each other. In other words, the final adjustment for the production of the hay roll considered best may be effected by adjusting the members 26, 27 relative to one another.

Although it is possible to obtain some of the results of the present invention by making the tines 40 of wire, preferably such tines are made of flat metal stock as shown in the drawings to provide an extended area upon which the hay may rest. However, the flat stock should not be too wide in relationship to their spacing, otherwise some hay may bind in the space between the tines, or rocks and stones may become lodged between adjacent tines.

It is apparent that it is within the province of one skilled in the art, with the teachings embodied herein, to pivotally mount the bars 43 in a manner different than that shown in Figure 4, and if desired, to make the tines 40 integral with their respective bars 43 instead of welding together two separate elements 40, 42.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. In a side delivery hay raking device of the character described, a supporting frame, and a plurality of individual spaced tines mounted on said frame in a line extending at an angle to the direction of movement of said device, each one of said tines having a compound curvature, lying generally on a continuous spiral and having the lower extremity thereof making an acute angle with the plane of the ground and spaced immediately above the ground to rake hay which lies on the ground.

2. In a side delivery hay raking vehicle of the character described, said vehicle having a central frame extending generally longitudinally thereof in the direction of movement of said vehicle, an outboard frame, means pivotally mounting said outboard frame on said central frame to adjustably space said outboard frame predetermined distances laterally of said central frame, said means comprising a pair of tine supporting members extending angularly with respect to said central and outboard frames, and each supporting member being pivotally mounted near opposite ends thereof to said central and outboard frames, said means comprising also a plurality of cross supports each having opposite ends thereof pivotally connected to respective ones of said pair of supporting members, said cross supports each having mounted thereon a tine, and each of said tines having a compound curvature, lying generally on a continuous spiral and having the lower extremity thereof making an acute angle with the plane of the ground and spaced immediately above the ground to rake hay which lies on the ground.

3. A side delivery hay raking vehicle of the character described having a chassis, a plurality of tines each mounted on said chassis in a line extending in echelon with respect to the direction of forward movement of said vehicle, each of said tines having a compound curvature and lying generally on a continuous spiral and having the lower extremity thereof making an acute angle with the plane of the ground and spaced immediately above the ground to rake hay which lies on the ground.

4. In a side delivery hay raking device of the character described, a frame adapted to be moved in raised position above the ground, a plurality of tines each mounted on said frame in a line extending in echelon with respect to the direction of movement of said frame, each of said tines having a compound curvature and lying generally on a continuous spiral and having the lower extremity thereof making an acute angle with the plane of the ground and spaced immediately above the ground to rake hay which lies on the ground.

5. In a side delivery hay raking device of the character described, a frame adapted to be moved in a position above the ground, a tine supporting structure mounting a plurality of tines which extend at an echelon angle with respect to forward movement of the frame, each of said tines having a compound curvature and lying generally on a continuous spiral, and means pivotally mounting said tine supporting structure on said frame to adjust the magnitude of said echelon angle, each one of said tines having the lower extremity thereof making an acute angle with the plane of the ground and spaced immediately above the ground to rake hay which lies on the ground.

6. In a side delivery hay raking device of the character described, a frame adapted to be moved above the surface of the ground, said frame comprising a pair of spaced parallel frame members and a pair of parallel extending tine supporting members each having opposite ends thereof pivotally mounted on corresponding ones of said frame members to thereby provide a pivoted parallelogram structure including said frame members and said tine supporting members, a plurality of tine supports each extending generally parallel with said frame members and each having opposite ends thereof pivotally connected to corresponding ones of said tine supporting members, a plurality of tines each mounted on corresponding ones of said tine supports, each of said tines having a compound curvature and lying generally on a continuous spiral and having the lower extremity thereof making an acute angle with the plane of the ground and spaced immediately above the ground to rake hay which lies on the ground.

7. In a side delivery hay-raking device of the character described, a supporting frame, a plurality of supporting bars each extending downwardly from said frame, means pivotally mounting each of said supporting bars on said frame near their upper ends, a plurality of tines each extending generally vertically and each attached at their lower ends to the lower ends of the corresponding supporting bars, the forward lower ends of said bars being pointed, and spring means disposed and acting between said supporting frame and said supporting bars tending to move the supporting bars closer to the ground.

8. In a side delivery hay-raking device of the character described, a supporting frame, a plurality of supporting bars each extending downwardly from said frame, means pivotally mounting each of said supporting bars on said frame near their upper ends, a plurality of tines each extending generally vertically and each attached at their lower ends to the lower ends of the corresponding supporting bars, and spring means disposed and acting between said supporting frame and said supporting bars tending to move the supporting bars closer to the ground.

9. The arrangement set forth in claim 8 in which each of said tines has a compound curvature, each one of said tines having the lower extremity thereof making an acute angle with the plane of the ground and spaced immediately above the ground to rake hay which lies on the ground.

10. In a side delivery hay raking vehicle of the character described, said vehicle having a central frame extending generally longitudinally thereof in the direction of movement of said vehicle, an outboard frame, means pivotally mounting said outboard frame on said central frame to adjustably space said outboard frame predetermined distances laterally of said central frame, said means comprising a pair of tine supporting members extending angularly with respect to said central and outboard frames, each supporting member being pivotally mounted near opposite ends thereof to said central and outboard frames, said means comprising also a plurality of cross members each having opposite ends thereof pivotally connected to respective ones of said pair of supporting members, said cross supports each having mounted thereon a corresponding supporting bar, each of said bars extending downwardly from said cross support, means pivotally mounting each of said supporting bars on a corresponding one of said cross supports, a plurality of tines each extending generally vertically and each attached at their lower ends to the lower ends of the corresponding supporting bar, spring means disposed and acting between said supporting frame and said supporting bars tending to move the supporting bars closer to the ground, each of said tines having a compound curvature and having the lower extremity thereof making an acute angle with the plane of the ground and spaced immediately above the ground to rake hay which lies on the ground.

FLOYD McCALL.
LLOYD McCALL.

References Cited in the file of this patent

UNITED STATES PATENTS

| Number | Name | Date |
|---|---|---|
| 352,205 | Roberts | Nov. 9, 1886 |
| 382,067 | Bally | May 1, 1888 |
| 601,504 | Davison | Mar. 29, 1898 |
| 1,037,418 | Blocki | Sept. 3, 1912 |
| 1,751,493 | Perkins | Mar. 25, 1930 |
| 2,179,583 | Wilson | Nov. 14, 1939 |